United States Patent
Jansen et al.

(10) Patent No.: US 9,835,723 B2
(45) Date of Patent: Dec. 5, 2017

(54) RADAR AMBIGUITY RESOLVING DETECTOR

(71) Applicant: NXP B.V., Eindhoven (NL)

(72) Inventors: Feike Guus Jansen, Eindhoven (NL); Zoran Zivkovic, Eindhoven (NL)

(73) Assignee: NXP B.V., Eindhoven (NL)

( * ) Notice: Subject to any disclaimer, the term of this patent is extended or adjusted under 35 U.S.C. 154(b) by 243 days.

(21) Appl. No.: 14/527,840

(22) Filed: Oct. 30, 2014

(65) Prior Publication Data
US 2016/0124086 A1 May 5, 2016

(51) Int. Cl.
*G01S 13/93* (2006.01)
*G01S 7/292* (2006.01)
(Continued)

(52) U.S. Cl.
CPC .......... *G01S 13/931* (2013.01); *G01S 7/2922* (2013.01); *G01S 13/227* (2013.01); *G01S 13/343* (2013.01);
(Continued)

(58) Field of Classification Search
CPC ... G01S 7/02; G01S 7/28; G01S 7/285; G01S 7/292; G01S 7/2921; G01S 7/2922;
(Continued)

(56) References Cited

U.S. PATENT DOCUMENTS 3,935,572 A * 1/1976 Broniwitz ........... G01S 13/4472
342/107
5,627,545 A * 5/1997 Van Genderen ...... G01S 13/227
342/137
(Continued)

FOREIGN PATENT DOCUMENTS

CN 103048657 A 4/2013
CN 103592645 A 2/2014
(Continued)

OTHER PUBLICATIONS

Stove, A. G.; "Linear FMCW Radar Techniques"; IEEE Proceedings F-Radar and Signal Processsing; vol. 139, Issue 5; pp. 343-350, printed in the year 1992.*
(Continued)

*Primary Examiner* — Bernarr E Gregory

(57) ABSTRACT

Various exemplary embodiments relate to a method for determining the velocity of an object using radar system having a processor, including: receiving, by a processor, a first digital signal corresponding to a first transmit signal; receiving, by the processor, a second digital signal corresponding to a second transmit signal; processing the first digital signal to produce a first range/relative velocity matrix; detecting objects in the first range/relative velocity matrix to produce a first detection vector; unfolding the first detection vector; processing the second digital signal to produce a second range/relative velocity matrix; interpolating the second range/relative velocity matrix in the relative velocity direction wherein the interpolated second range/relative velocity matrix has a frequency spacing corresponding to the frequency spacing of the first range/relative range velocity matrix in the relative velocity direction; detecting objects in the second range/relative velocity matrix to produce a second detection vector; unfolding the second detection vector; and determining a true velocity of the detected objects based upon the unfolded first and second detection vectors.

20 Claims, 12 Drawing Sheets

(51) Int. Cl.
| | |
|---|---|
| *G01S 13/58* | (2006.01) |
| *G01S 13/22* | (2006.01) |
| *G01S 13/34* | (2006.01) |
| *G01S 13/42* | (2006.01) |
| *G01S 13/524* | (2006.01) |
| *G01S 13/00* | (2006.01) |
| *G01S 7/35* | (2006.01) |

(52) U.S. Cl.
CPC ............ *G01S 13/42* (2013.01); *G01S 13/582* (2013.01); *G01S 13/584* (2013.01); *G01S 13/5246* (2013.01); *G01S 2007/356* (2013.01); *G01S 2013/9321* (2013.01)

(58) Field of Classification Search
CPC .......... G01S 7/2923; G01S 7/35; G01S 7/352; G01S 2007/356; G01S 7/288; G01S 2007/2883; G01S 13/02; G01S 13/06; G01S 13/08; G01S 13/10; G01S 13/22; G01S 13/227; G01S 13/32; G01S 13/34; G01S 13/343; G01S 13/42; G01S 13/50; G01S 13/52; G01S 13/522; G01S 13/524; G01S 13/5246; G01S 13/526; G01S 13/584; G01S 13/88; G01S 13/528; G01S 13/58; G01S 13/581; G01S 13/582; G01S 13/583; G01S 13/20; G01S 13/93; G01S 13/931; G01S 2013/9321; G01S 13/44; G01S 13/4472

See application file for complete search history.

(56) References Cited

U.S. PATENT DOCUMENTS

| | | | |
|---|---|---|---|
| 7,864,106 B2 * | 1/2011 | Beilin ................ | G01S 13/5246 342/104 |
| 9,541,638 B2 | 1/2017 | Jansen et al. | |
| 2011/0074620 A1 | 3/2011 | Wintermantel | |
| 2015/0084806 A1 | 3/2015 | Rohling | |

FOREIGN PATENT DOCUMENTS

| | | |
|---|---|---|
| DE | 102009016480 A1 | 3/2010 |
| DE | 102012008350 A1 | 10/2013 |
| EP | 0239022 A2 | 6/1989 |
| EP | 0239022 A3 | 6/1989 |
| EP | 0709694 A1 | 3/1995 |

OTHER PUBLICATIONS

Kees, et al., "Improvement of Angular Resolution of a Milimeterwave Imaging System by Transmitter Location Multiplexing", 1995 IEEE Microwave Systems Conference, 105-108.
Extended European Search Report for Patent Appln. No. 15191207.8 (Mar. 15, 2016).
Kronague, Matthias et al; "Radar Target Detection and Doppler Ambiguity Resolution"; 11th International Radar Symposium; IEEE, Piscataway, NJ, USA; p. 1-4 (Jun. 16, 2010).
Martin, J; "Range and Doppler Accuracy Improvement for Pulse Doppler Radar", Radar '97 IEEE Conference Publication, vol. No. 449, London, GB, Oct. 14, 1997 pp. 439-443; (1997).
Schmid, C.M. et al; "Motion Compensation and Efficient Array Design for TDMA FMCW MIMO Radar Systems" 2012 6th European Conference on Antennas and Propagation; pp. 1746-1750 (2012).
Schroeder, Christoph et al; "X-Band FMCW Radar System with Variable Chirp Duration"; IEEE Radar Conference, Piscataway, NJ, USA; pp. 1255-1259 (May 10, 2010).
Song, Minki et al; "Enhancing Doppler Estimation via Newton Interpolation for Automotive FMCW Radars"; 2014 International Conference on Information and Communication Technology Convergence; IEEE; pp. 615-616 (Oct. 22, 2014).
Stove, A.G.; "Linear FMCW Radar Techniques"; IEE Proceedings F-Radar and Signal Processing, vol. 139, Issue 5; pp. 343-350 (1992).
Wikipedia; "Hadamard Code"; retrieved from the internet https://en.wikipedia.org/wiki/Hadamard_code Mar. 18, 2016; 8 pages (2016).
Zhang Jian-hui et al; "Coded Stepped-FWCW Signal for Automotive Collision Warning Radar Applications"; p. 943-946; ACTA Electronica Sinica vol. 29, No. 7 (Jul. 2001) English abstract.

* cited by examiner

US 9,835,723 B2

RADAR AMBIGUITY RESOLVING DETECTOR

TECHNICAL FIELD

Various exemplary embodiments disclosed herein relate generally to radar systems.

BACKGROUND

Radar systems may be used to detect the range and velocity of nearby targets. With various advances in technology, radar systems may now be applied in many different applications. For example, automotive radar systems are seen as crucial to increasing road safety.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method for determining the velocity of an object using radar system having a processor, including: receiving, by a processor, a first digital signal corresponding to a first transmit signal; receiving, by the processor, a second digital signal corresponding to a second transmit signal; processing the first digital signal to produce a first range/relative velocity matrix; detecting objects in the first range/relative velocity matrix to produce a first detection vector; unfolding the first detection vector; processing the second digital signal to produce a second range/relative velocity matrix; interpolating the second range/relative velocity matrix in the relative velocity direction wherein the interpolated second range/relative velocity matrix has a frequency spacing corresponding to the frequency spacing of the first range/relative range velocity matrix in the relative velocity direction; detecting objects in the second range/relative velocity matrix to produce a second detection vector; unfolding the second detection vector; and determining a true velocity of the detected objects based upon the unfolded first and second detection vectors.

Various embodiments described herein relate to a radar system including: a waveform generator configured to produce a first transmit signal including a first sequence of waveforms and a second transmit signal including a second sequence of waveforms, wherein the first and second transmit signals have different waveform repetition rates and the length of the sequences of the first and second signals is nearly equal; a transmitter configured to transmit the first and second transmit signals; a first receiver including: a first downconverter configured to downconvert the first received signal to produce a first downconverted signal and downconvert the second received signal to produce a second downconverted signal, wherein the first received signal corresponds to the first transmitted signal and the second received signal corresponds to the second transmitted signal; and a first analog to digital converter configured to convert the first downconverted signal to a first digital signal and the second downconverted signal to a second digital signal; a digital signal processor configured to: process the first digital signal to produce a first range/relative velocity matrix; detect objects in the first range/relative velocity matrix to produce a first detection vector; unfold the first detection vector; process the second digital signal to produce a second range/relative velocity matrix; interpolate the second range/relative velocity matrix in the relative velocity direction wherein the interpolated second range/relative velocity matrix has a frequency spacing corresponding to the frequency spacing of the first range/relative velocity matrix in the relative velocity direction; detect objects in the second range/relative velocity matrix to produce a second detection vector; unfold the second detection vector; and determine a true velocity of the detected objects based upon the unfolded first and second detection vectors.

Various embodiments described herein relate to a radar system including: a transmitter configured to transmit a first transmit signal and a second transmit signal; a receiver producing a first digital signal and a second digital signal; a digital signal processor configured to: receive, by a processor, the first digital signal corresponding to the first transmit signal; processing the first digital signal to produce a first range/relative velocity matrix; detect objects in the first range/relative velocity matrix to produce a first detection vector; unfold the first detection vector; when objects are detected in the first signal data: receive the second digital signal corresponding to the second transmit signal; process the second digital signal to produce a first range/relative velocity matrix; interpolate the second range/relative velocity matrix in the relative velocity direction wherein the interpolated second range/relative velocity matrix has a frequency spacing corresponding to the frequency spacing of the first range/relative range velocity matrix in the relative velocity direction; detect objects in the second range/relative velocity matrix to produce a second detection vector; unfold the second detection vector; and determine a true velocity of the detected objects based upon the unfolded first and second detection vectors.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

Figure 1:
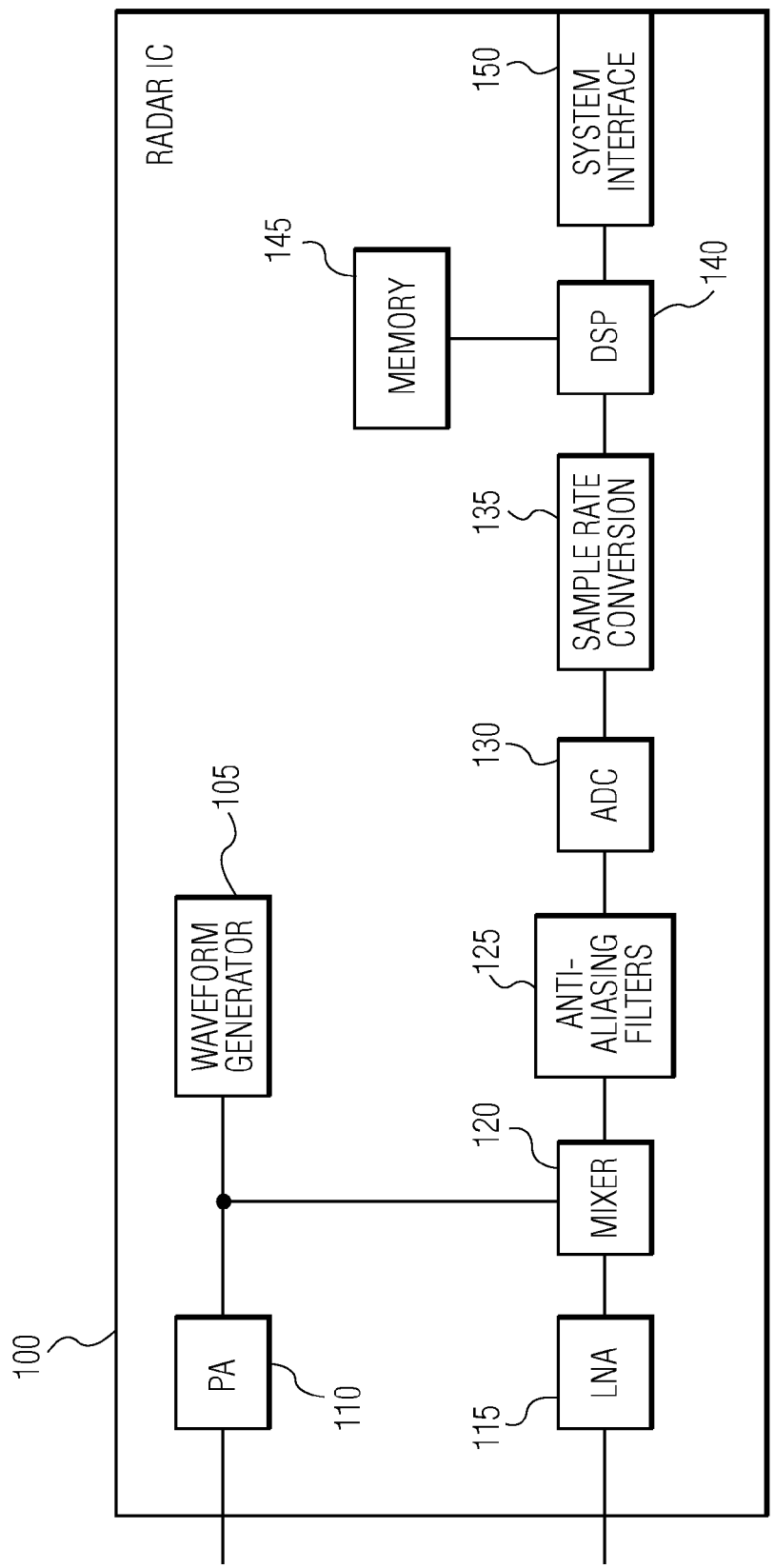
FIG. 1 illustrates a functional diagram of an embodiment of a FMCW radar system.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Automotive radar systems are seen as crucial to increasing road safety. In such an application, it is required that the radar system measures the radial distance to a reflecting object and its relative radial velocity. In both measurements, a certain maximum value to be measured may be specified, and furthermore the measurement should be unambiguous. Accordingly, the signal representing the radial distance and relative radial velocity may be sampled with a sampling frequency that is at least twice as high as the highest frequency component in the signal. However in some cases this criterion cannot be met, and the measurement becomes ambiguous. That is to say that the detected object may have multiple possible distances and/or velocities. While an automotive radar is discussed herein, it is noted that the various teachings of the embodiments described below may be applied to radar systems used in other applications.

Techniques to extend the unambiguous measurement range of a frequency are known in literature; see for example the following references: G. V. Trunk et al., "Multiple Target Ambiguity Resolution," Radar Conference, 1994., Record of the 1994 IEEE National DOI, 1994, pp. 91-94 IEEE 1994; Z. Xinguo et al., "Range and velocity ambiguity resolution based on screening method," Radar Conference, 2009 IET International, pp. 1-3; H. Rohling, "Resolution of Range and Doppler Ambiguities in Pulse Radar Systems," Proceedings of Digital Signal Processing, Florence, 1987; M. Musa et al., "Ambiguity elimination in HF FMCW radar systems," IEE Proc.-Radar Sonar Navig., Vol. 147, No. 4, August 2000, pp. 182-188. These references have in common that they use multiple measurements using different sampling frequencies. Lists of detected objects are processed in a combining stage that eliminates the aliases and keeps the true frequencies. These techniques require accurate frequency estimates in each measurement and are prone to make errors in the combining process.

In M. Kronauge et al., "Radar Target Detection and Doppler Ambiguity Resolution" 2010 11th International Radar Symposium (IRS) and C. Schroeder et al., "X-Band FMCW Radar System with Variable Chirp Duration" 2010 IEEE these techniques are improved by performing the combining stage before the detection operation. This lowers the chance of making errors and lowers computational complexity. In Kronauge a technique is described that combines the spectra of two sampled measurements. The two spectra, however, are not sampled at equal frequencies and therefore the combining is not always correct. The embodiments described below present an increase in performance.

Automotive radar systems may use a sequence of identical waveforms as transmit signal. The waveform may, for example, be based upon a frequency modulated continuous wave (FMCW) principle. Two different ambiguities may occur using such a waveform. In the first case, the frequency with which the received signal is sampled is too low resulting in an ambiguous relative distance measurement. In the second case, the duration of the waveforms in the sequence is too long resulting in an ambiguous relative radial velocity measurement.

In both cases, the ambiguity arises due to a uniform sampling with a fixed sampling frequency that is too low. The frequency to be estimated (which is used to determine range and relative radial velocity) may not appear at its true position in the frequency spectrum, but instead at its aliased position.

By repeating the measurement with a different sampling frequency, the position in the frequency spectrum at which the frequency appears that is to be estimated differs from the original measurement. From these different aliased positions the true velocity may be determined.

Another challenge for a radar system is to estimate the relevant frequencies of a reflecting object when the received signal includes the reflected signals of a multitude of reflectors. In that case the system might combine the aliased spectra of different objects resulting in false frequency estimates, and hence range and relative velocity measurement errors.

In an automotive radar system, a signal, modulated according to a specific waveform type, may be transmitted at a certain carrier frequency (e.g., 79 GHz). The reflected signals are down-converted to baseband signals by an analog receiver, sampled, and then processed by the digital part of the system. In these processing steps the distance to an object, the relative radial velocity between the radar and the object, and angle of arrival (AOA) of the signal reflected from the object are calculated.

A frequency modulated continuous wave (FMCW) provides a suitable waveform for automotive radar systems due to its accuracy and robustness. Especially the implementation, in which a sequence of short duration frequency chirps is transmitted, has beneficial properties with respect to the detection of objects moving with a non-zero relative radial velocity.

FIG. 1 illustrates a functional diagram of an embodiment of a FMCW radar system. The signal that is received is delayed in time with respect to the transmitted signal. The time delay is due to the propagation time between the radar system and the reflecting object in the outward and return direction. The radar system 100 may include a waveform generator 105, a power amplifier 110, a low noise amplifier (LNA) 115, a mixer 120, anti-aliasing filters 125, an analog-to-digital converter (ADC) 130, a sample rate convertor 135, a digital signal processor (DSP) 140, memory 145, and a system interface 150. The waveform generator 105 generates a continuous wave signal with a frequency chirp. The PA receives and amplifies the frequency chirped continuous wave signal. This signal may then be radiated by a transmit antenna in order to detect objects. A reflected signal may be received by a receive antenna. The LNA 115 receives the reflected signal from the receive antenna and amplifies it. The mixer 120 then receives the amplified received signal and mixes it with the current transmit waveform generated by the waveform generator 105. The anti-aliasing filters 125 then filters the mixed signal. The ADC 130 then samples and converts the filtered mixed signal is to a digital signal. The sample rate converter 135 may then convert the sample rate of the digital signal to another sample rate. This will be described in greater detail below. The DSP 140 then processes the received digital signals to produce various desired measurements of detected objects such as range, relative radial velocity, and angle of arrival (AOA). The memory 145 provides memory to the DSP 140 to use in order to process the received digital signals. The system interface 150 provides an external interface that may be used to supply measurement information to other systems. The radar system 100 may be implemented on a single integrated circuit (IC). It may also be implemented as a combination of ICs.

Figure 2:
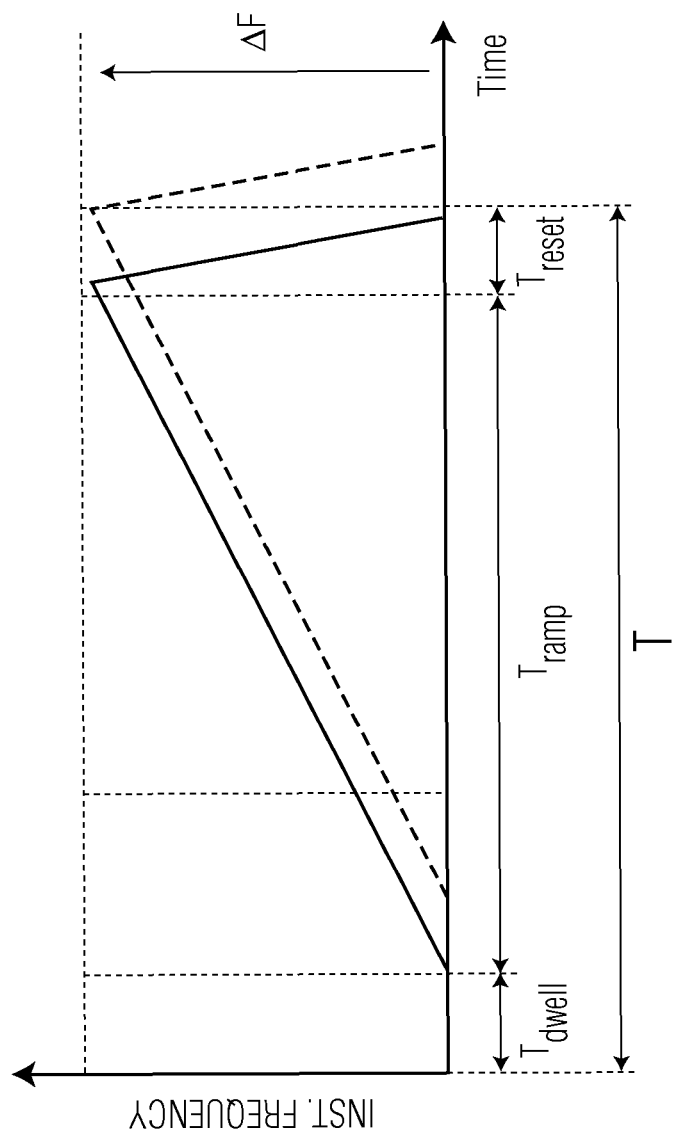
FIG. 2 illustrates an example of FMCW waveform signal.

The operation of the radar system 100 illustrated in FIG. 1 and the signal processing used to detect objects will now be described. In an FMCW system, a sine wave with a linearly increasing (or decreasing frequency) is transmitted. FIG. 2 illustrates an example of FMCW waveform signal. The signal has a period of T. During a first time period $T_{dwell}$ the transmit waveform has a constant frequency equal to the carrier frequency of the transmit signal generated by the waveform generator 110. Then during a second time period $T_{ramp}$, the frequency of the transmit waveform is increased linearly for a total frequency change of ΔF. Finally, during a third time period $T_{reset}$ the frequency of the transmit signal is quickly reduced back to the carrier frequency. Accordingly, $T=T_{dwell}+T_{ramp}+T_{reset}$.

In the down conversion operation, the mixer 120 mixes the current transmit signal produced by the waveform generator 105 with the time delayed received signal. This delayed received signal for a single reflecting object is illustrated in FIG. 2 by the dotted line waveform. When the relative velocity between the radar system 100 and the reflecting object is zero, the received signal is a time delayed signal, attenuated, and phase rotated version of the transmitted signal.

The result of the down conversion operation is a sine wave oscillating at the so-called beat frequency referred to as a beat signal which has a beat frequency based upon the frequency difference between the transmit signal and the receive signal. This beat frequency depends on the distance D to the reflecting object the difference between the start and the stop frequency of the ramp $\Delta f_1$ and the duration of the ramp $T_{ramp}$:

$$f_{beat} = \frac{\Delta F}{T_{ramp}} \frac{2D}{c_o}, \quad (1)$$

where $c_n$ is equal to the speed of light. When multiple reflectors are visible to the radar, the beat signal will be a summation of sine waves oscillating at their respective beat frequencies having an amplitude based upon the radar cross section and distance of the reflector.

The DSP 140 processes the received signals to estimate the magnitude of the oscillation frequencies. Therefore, after the ADC 130 samples and quantizes the signal, the DSP 140 may use a Fast Fourier Transformation (FFT) to estimate the oscillating frequency. The frequency at which the samples are taken by the ADC is $f_{adc}$. According to the sampling theorem the maximum frequency that can be represented by the digital signal is the Nyquist frequency equal to half of $f_{adc}$ for real valued samples. Reflecting objects at large distances may have beat frequencies exceeding half of $f_{adc}$. As a result, their position in the frequency spectrum is ambiguous, e.g., it is the position in the baseband spectrum plus an unknown integer multiple of $f_{adc}$.

In some cases the far-away reflectors are not of interest. To prevent this undesired aliasing, anti-aliasing filters 125 may be used. These filters strongly attenuate the frequency components exceeding the Nyquist frequency of $f_{adc}/2$. The anti-aliasing filters may be realized as a combination of analog and digital filters. Other implementations of anti-aliasing filters may be used as well.

When the relative velocity is non-zero, the corresponding Doppler frequency is added to the beat frequency. The Doppler frequency can be calculated by:

$$f_{Doppler} = \frac{2Vf_c}{c_o}. \quad (2)$$

For automotive radar systems with $f_c$=79 and a relative radial velocity of V=300 km/h then $f_{Doppler}$≈44 kHz.

However the duration of the chirp may be very short, for example 100 μs, and the frequency deviation may be, for example, at least several tens of MHz. As a result the magnitude of the Doppler frequency is very small compared to the magnitude of the beat frequency and may be ignored in the calculation of the distance.

The effect of the Doppler frequency shift is more pronounced on the phase of the beat signal. The increase (or decrease) of the phase of the received signal from chirp to chirp in radians is given by:

$$\phi_{Doppler}=2\pi f_{Doppler}T; \quad (3)$$

$$T=T_{ramp}+T_{dwell}+T_{reset}. \quad (4)$$

Figure 3:
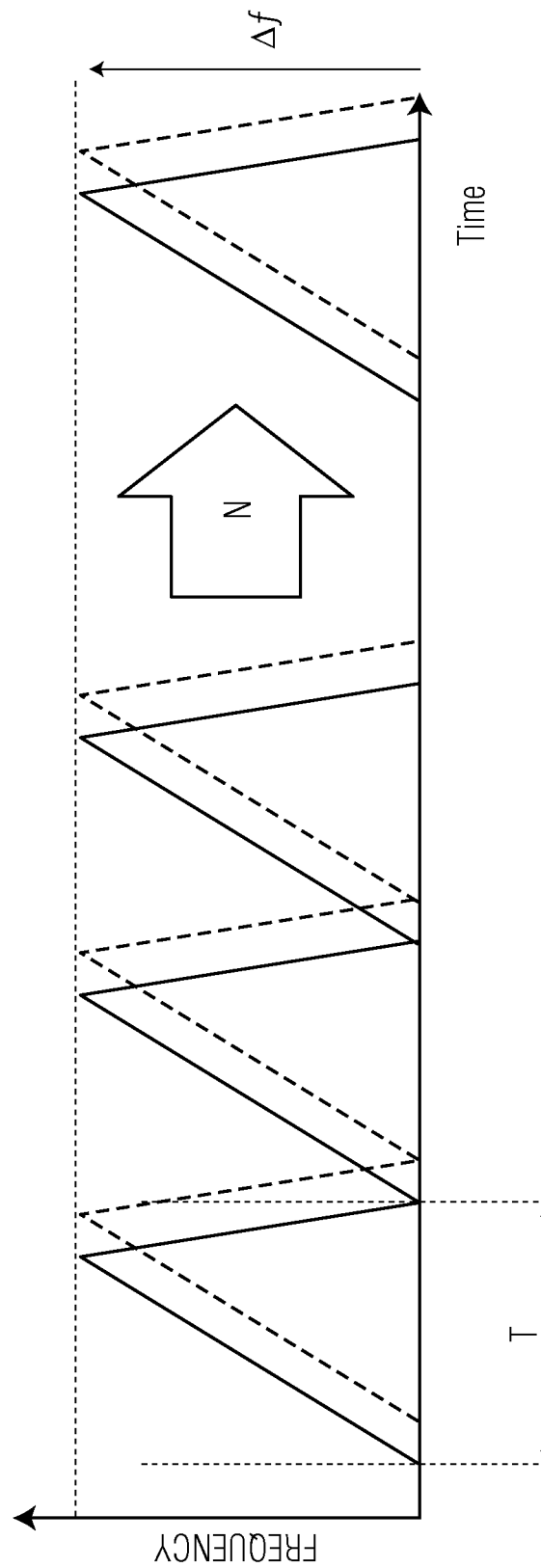
FIG. 3 illustrates such a sequence of N chirps.

The evolution of this phase may be measured by using a sequence of FMCW chirps. FIG. 3 illustrates such a sequence of N chirps.

Figure 4:
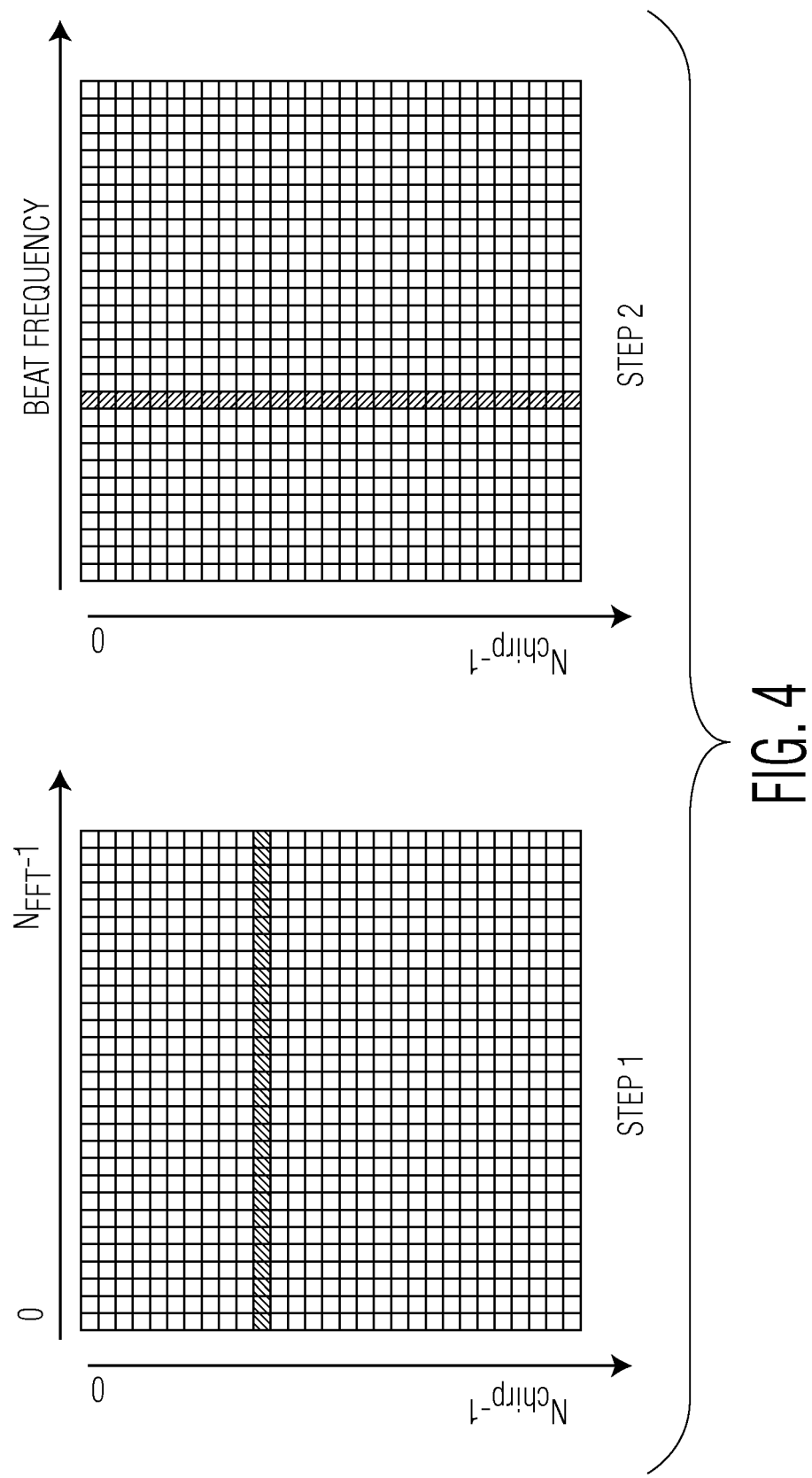
FIG. 4 illustrates the two FFT steps of the calculation of a two dimensional FFT.

A two dimensional FFT may be used to calculate the relative radial velocity to the reflector along with the range of the reflector. FIG. 4 illustrates the two FFT steps of the calculation of a two dimensional FFT. The DSP 140 may calculate an FFT on the set of data samples corresponding to each transmitted FMCW chirp in the sequence of FMCW chirps. Each row in step 1 corresponds to one of the FMCW chirps in the sequence. Each resulting frequency sample of the FFT corresponds to a specific received beat frequency and hence a range, resulting in a series of range gates.

Once all of the FMCW chirps in the sequence have been received and processed using an FFT, the DSP 140 may then in step 2 perform an FFT on data samples in the columns. This second FFT determines the contribution of the Doppler effect on the frequency of the received signal due to any relative velocity between the radar system 100 and the reflector.

However when $\phi_{Doppler}$ exceeds π, the velocity measurement will be ambiguous. The Doppler component is sampled with a sampling frequency equal to:

$$f_{z,Doppler}=T^{-1}$$

Therefore the absolute maximum relative velocity that can be measured unambiguously is limited by the total duration of a single chirp.

Figure 5:
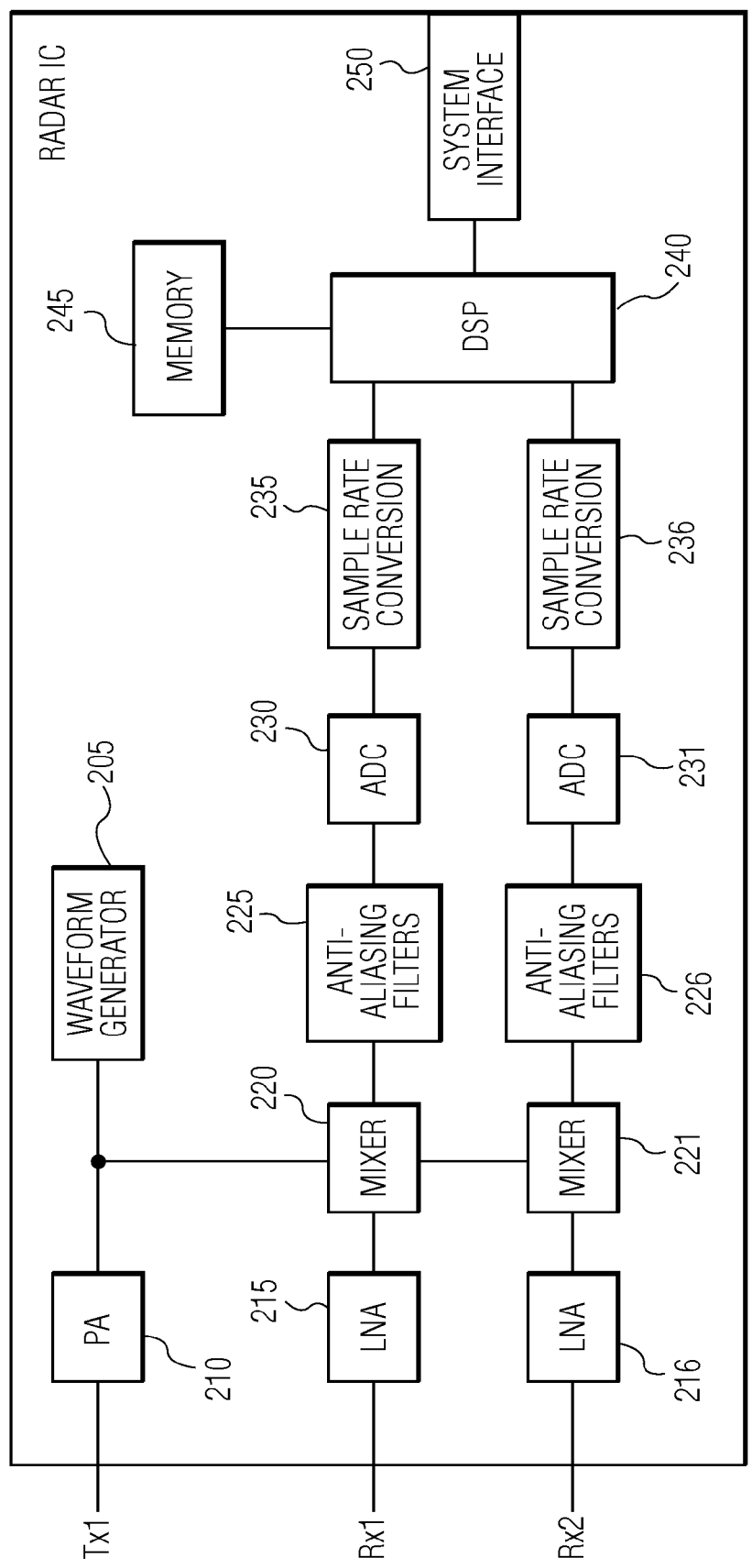
FIG. 5 illustrates a functional diagram of another embodiment of a FMCW radar system with a single transmit antenna Tx1 and two receive antennas Rx1 and Rx2.

FIG. 5 illustrates a functional diagram of another embodiment of a FMCW radar system with a single transmit antenna Tx1 and two receive antennas Rx1 and Rx2. The radar system 200 may also include more than one transmit antenna and/or more than two receive antennas. The radar system 200 may include a waveform generator 205, a power amplifier 210, LNAs 215 and 216, mixers 220 and 221, anti-aliasing filters 225 and 226, ADCs 230 and 231, sample rate convertors 235 and 236, a digital signal processor (DSP) 240, memory 245, and a system interface 250. The various elements of the radar system 200 operate in the same manner as the same elements in the radar system 100 illustrated in FIG. 1 with exceptions as described below.

Figure 6:
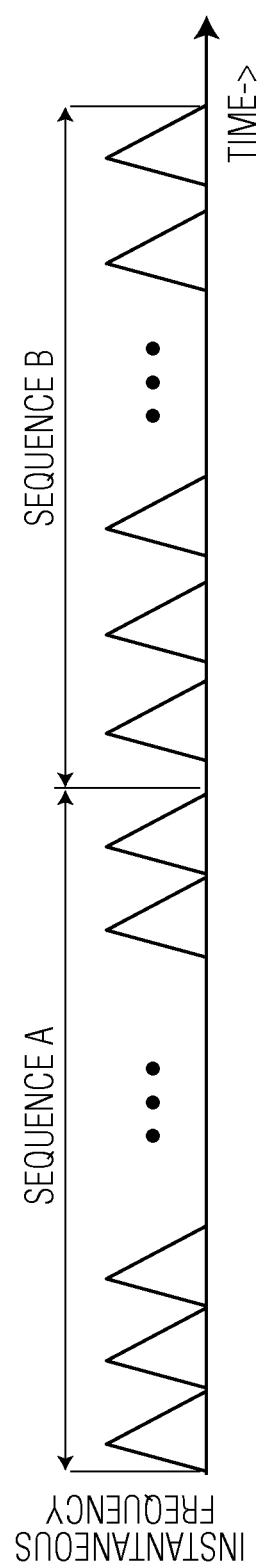
FIG. 6 illustrates two sequences of waveforms.

The waveform generator 205 may produce a sequence of waveforms. FIG. 6 illustrates two sequences of waveforms. Each waveform may be a sine wave of which the oscillation frequency decreases during a time period $T_{ramp,A}$ and the waveform may have a period of $T_A$. In the next phase a second sequence is generated in the same manner with the exception that the waveform may have a time period $T_B$ that is longer than $T_A$. The total duration of the chirp may be adjusted by means of the dwell time (see FIG. 2) that is longer in sequence B than in sequence A. Furthermore, the number of waveforms in the B sequence may be fewer than in the A sequence such that the number of sequences is chosen in such a way that the total duration or total dwell time of measurement A is close to the total duration of measurement B. Depending upon the application the closeness two total dwell times may vary. For example, they may be within 1%, 2%, 5%, 10%, 20%, or 25% of one another.

Figure 7:
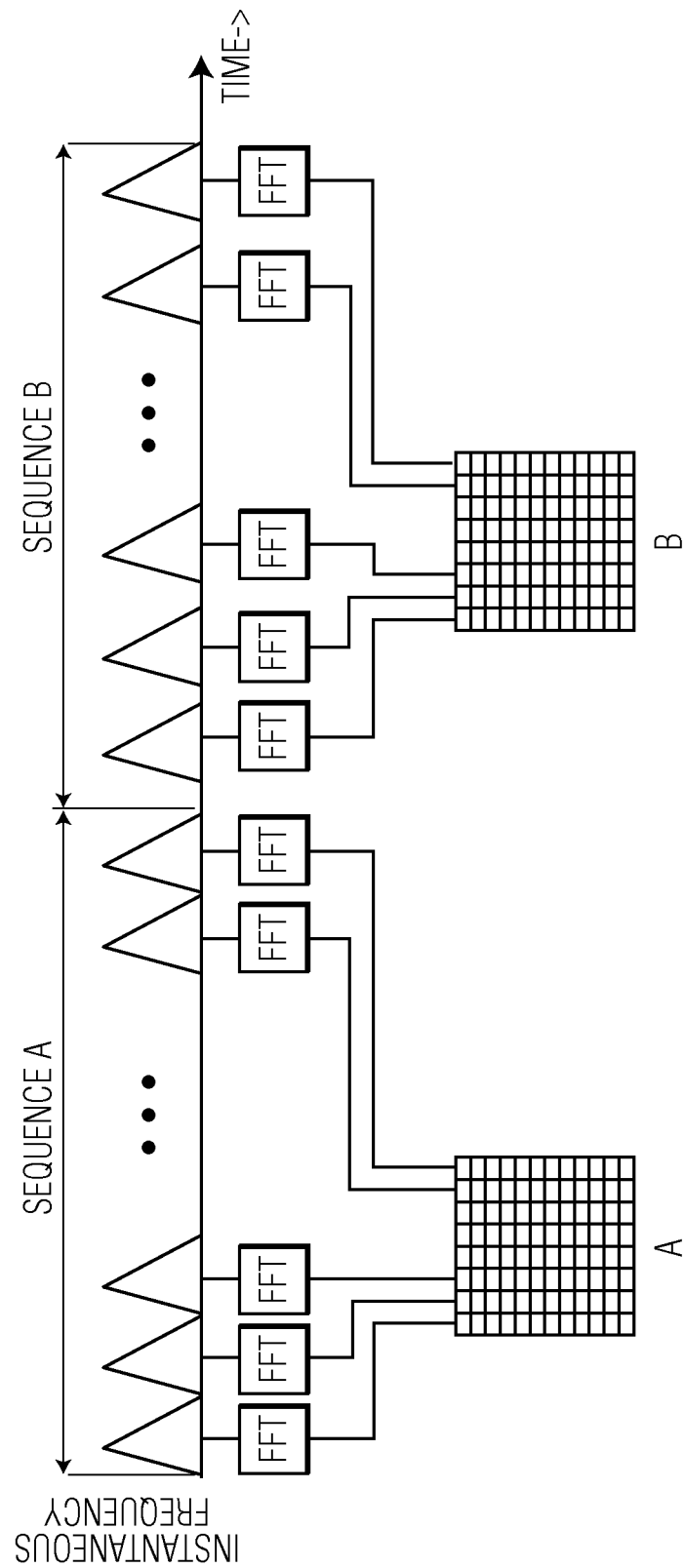
FIG. 7 illustrates the 2D FFT processing for two different sequences.

For each receiver Rx1 and Rx2, at least two sets, measurement A and measurement B, are processed by a 2D FFT operation. FIG. 7 illustrates the 2D FFT processing for two different sequences. Note that the first FFT is performed on the data sampled during the transmission of a single chirp. The outcomes of the FFTs are stored in the columns of matrix A for measurement A and in matrix B for measurement B. The second FFT is performed on each row of matrix A and B. After the second round of FFTs have been finished a 2D matrix has been calculated in which the relative radial velocity is represented along the rows of the matrix and the distance to a reflector represented along the columns of the matrix. For a reflector with a high relative radial velocity aliasing will occur. Therefore the velocity response will appear in an aliased position in the rows of the 2D matrix corresponding to the distance to that reflector. The aliased position will, however, be different for measurement A and B because of the difference in the duration of the chirp.

Figure 8A:
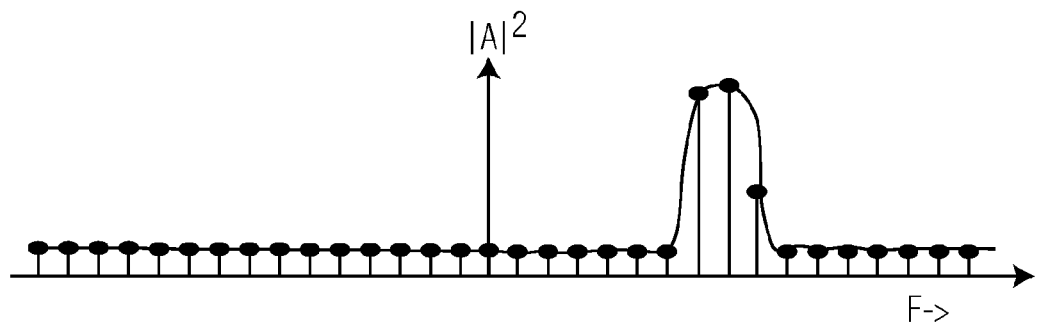
FIGS. 8A, 8B, and 8C illustrate the sampled frequencies for the A and B measurements and then the combination of the two sets of measurements without interpolation.
Figure 8B:
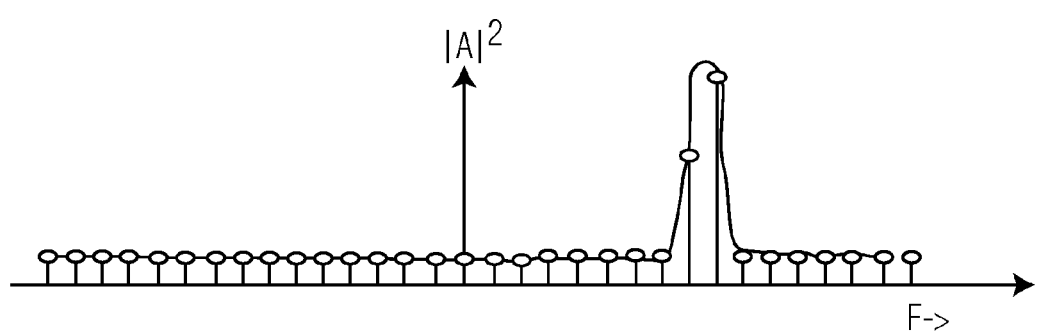
Figure 8C:
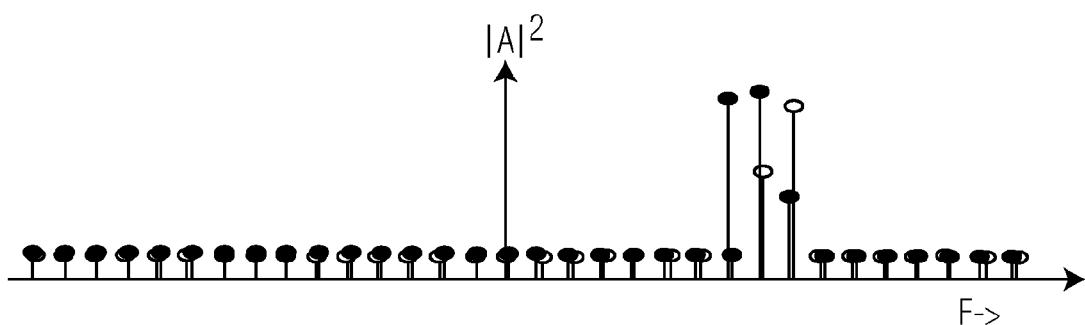

A method to improve the performance of the radar system by interpolating frequency samples of one of the measurement matrices will now be described. The sample points of the rows may be aligned along the velocity dimension (rows) and object detection may be performed. The alignment may be achieved by interpolating the values of the row vector of the A matrix to the sampling points of the row vector of the B matrix. Alternatively, the values of the row in the B matrix may be interpolated to the sampling points of the A matrix. The Doppler spectra A and B are sampled at different Doppler frequencies because their respective chirps are not equally long. To match the sampling points the absolute value of the A spectrum may be interpolated to the sampling grid of the B spectrum. Matching the resolution of the B measurement to the A measurement may be obtained using fewer chirps than the A measurement. Therefore the number of chirps for the B measurement is equal to:

$$N_B = \left\lceil \frac{N_A T_A}{T_B} \right\rceil$$

Where $N_A$ and $N_B$ represent the number of chirps in the A and B measurements respectively and $T_A$ and $T_B$ represent the duration of a single waveform in the A and B measurements respectively. In the calculation of the spectrum the data is zero-padded to match the number of samples in the A measurement. Omitting this step results in a misalignment of the samples and therefore non-coherent addition will fail and the target is not detected. FIGS. 8A, 8B, and 8C illustrate the sampled frequencies for the A and B measurements and then the combination of the two sets of measurements without interpolation. Because the frequency spectra are not properly frequency aligned using interpolation, the peaks of the detections do not line up and the peak indicating an object is spread out.

Figure 9:
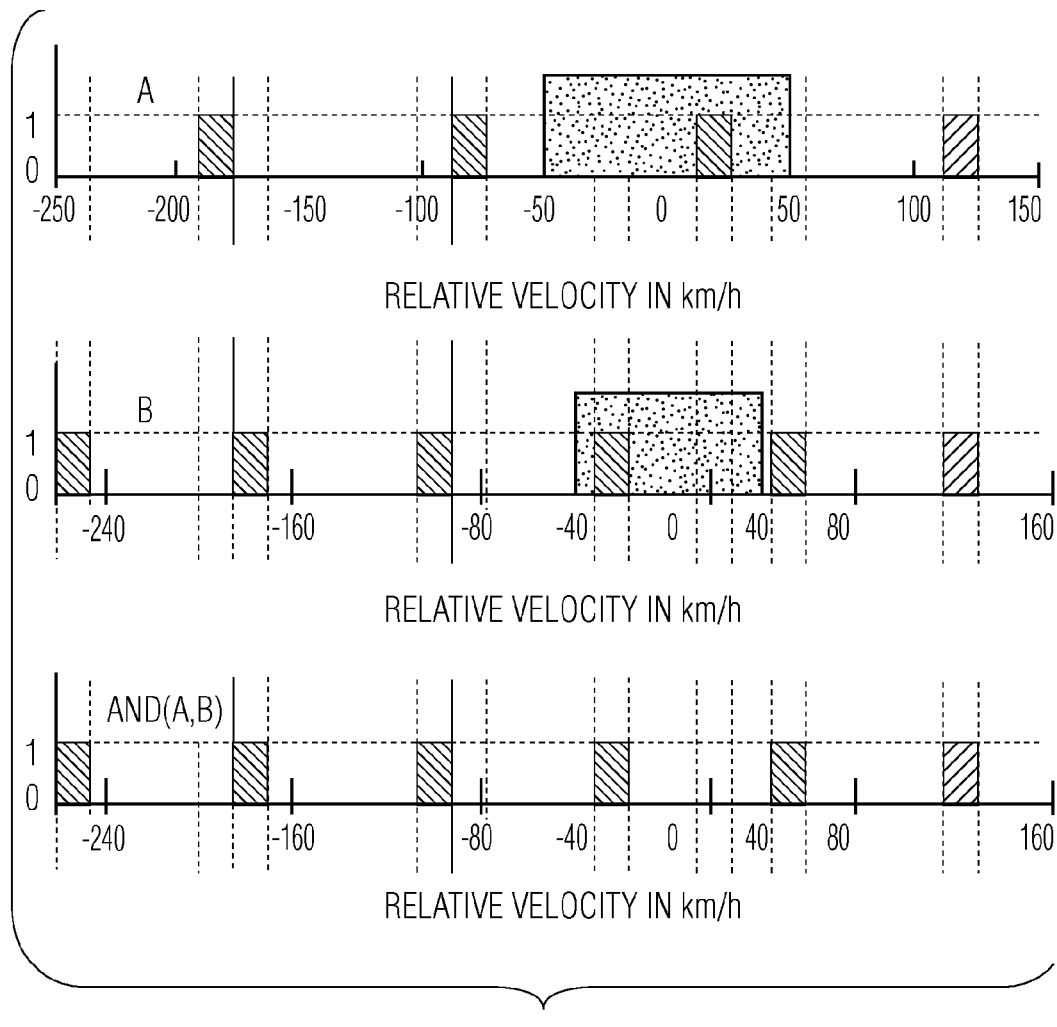
FIG. 9 illustrates the unfolding of detection row vectors for measurements A and B.

In the next step, an object detector may be used to detect objects in both spectra. The object detector may be a type of constant false alarm rate (CFAR) detector. An element by element hard detection is performed in which an element of an additional row detection vector set to one if an object is detected or zero otherwise. Then both additional row detection vectors may be unfolded along the velocity dimension by means of repetition. FIG. 9 illustrates the unfolding of detection row vectors for measurements A and B. The grey colored boxes represent the Nyquist equivalent velocity sampling region of ±50 km/h and ±40 km/h for A and B spectra respectively. These spectra are repeated 3 and 5 times for A and B respectively. The response (elements set to one by CFAR detector) of the aliased velocity reflector will appear at multiple positions in the additional unfolded row vectors. The boxes with the diagonal shading represent the aliased positions of a 120 km/h reflecting object while the box with the dots represents the un-aliased position. However the response will appear at the same position index in both spectra when that index corresponds to the true frequency that is to be estimated. The responses corresponding to aliased velocities will appear at different indices in both additional row vectors. Therefore, if a logical AND operation is performed on the elements of both unfolded row vectors, so that the outcome will only be equal to one if the index corresponds to the non-aliased velocity. Therefore by examining the outcome of the AND operation the non-aliased velocity will be revealed as illustrated by the box with dots.

Figure 10:
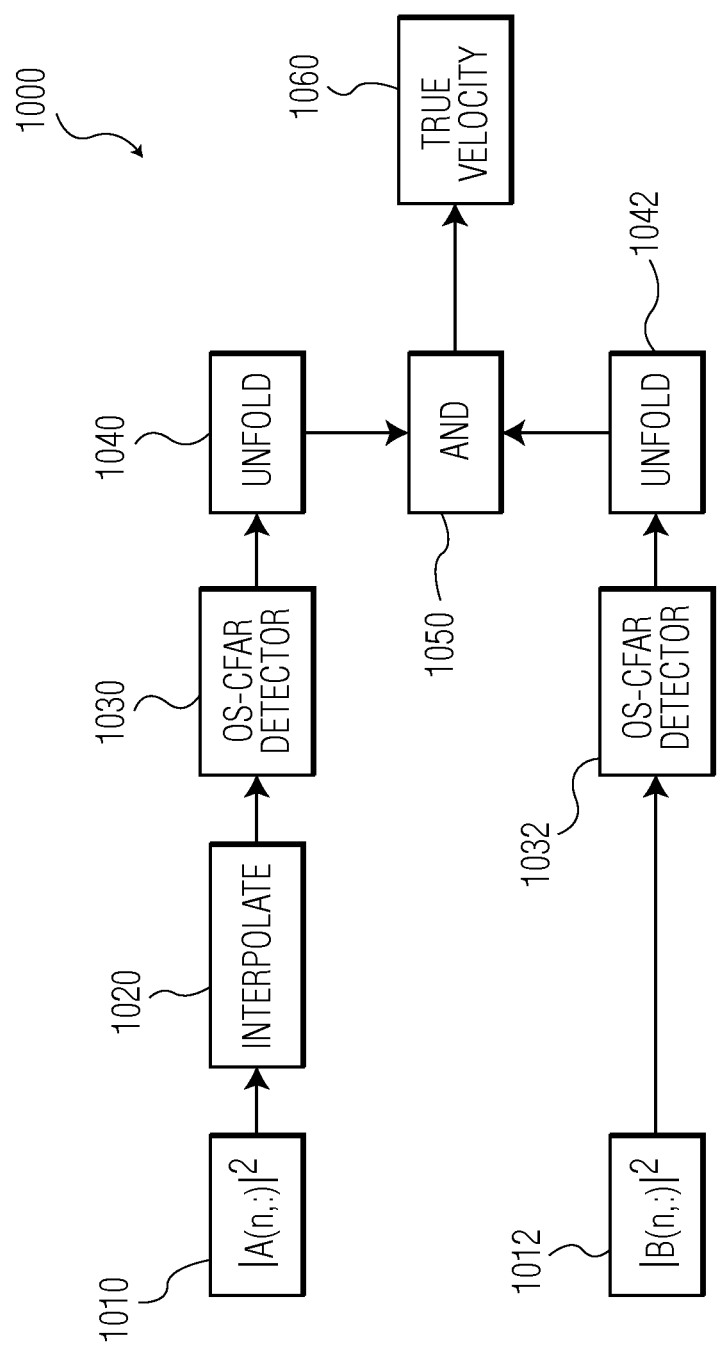
FIG. 10 illustrates a block diagram of an exemplary embodiment of the signal processing used to determine the radial velocity of a reflector.

FIG. 10 illustrates a block diagram of an exemplary embodiment of the signal processing used to determine the radial velocity of a reflector. The DSP 140 or 240 may perform this processing. The value $|A(n,:)|^2$, which is the power spectrum of the A measurement, corresponding to the element wise absolute value squared of the elements of the $n^{th}$ row vector of matrix A are first calculated 1010. In the same manner, the value $|B(n,:)|^2$ corresponding to the element wise absolute value squared of the elements of the $n^{th}$ row vector of matrix B are next calculated 1012. The power spectrum of the A measurement next may be interpolated to align with the sample points of the B measurement 1020. Both power spectra are processed by a CFAR type detector, for example, an ordered statistics CFAR (OS-CFAR) 1030 and 1032. Other types of CFAR or other detectors may be used as well. Then each of the output detection vectors may be unfolded 1040 and 1042. The unfolded output detection vectors may then be processed by the logical AND operation 1050. This results in the fact that the positions where the vector output of the AND operation equal one represent the true velocity of a detected reflector 1060.

For multiple reflecting objects or reflecting objects with an extended spectral response, the responses shown, for example, in FIG. 8 may overlap. As a consequence the radar may erroneously determine that two unfolded responses coincide at a certain relative velocity, while in fact those responses belong to different objects. The radar could then declare a positive match making an error. To remove these false positives an additional verification may be performed. The angle of arrival of the responses in the two detection vectors may be compared to provide this additional verification. In order to determine the AOA, more than one receive antenna may be used. It is also noted that combining the signals received by two antennas may improve the sensitivity of the radar system.

Figure 11:
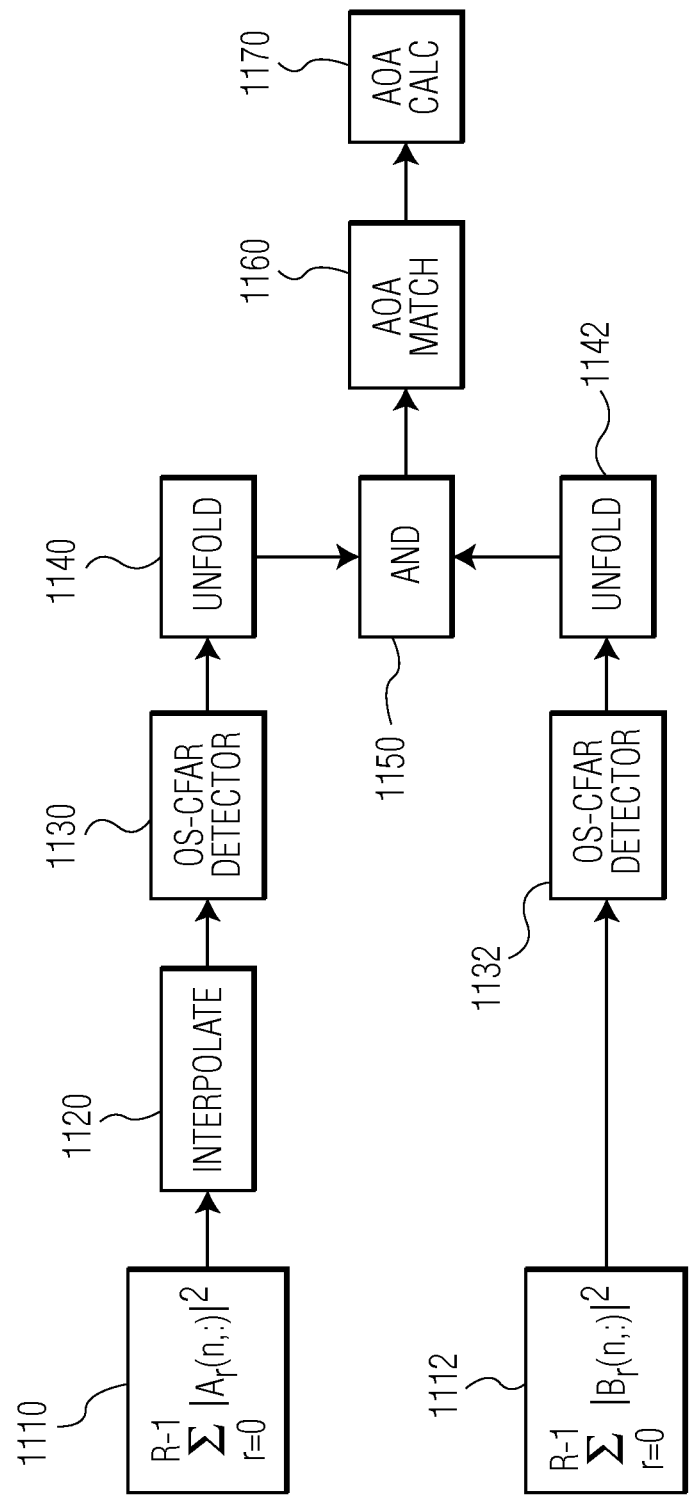
FIG. 11 illustrates a block diagram of an embodiment of the signal processing used to determine the radial velocity of a reflector as well as the angle of arrival.

FIG. 11 illustrates a block diagram of an embodiment of the signal processing used to determine the radial velocity of a reflector as well as the angle of arrival. The DSP 140 or 240 may perform this processing. The value $$\sum_{r=0}^{R-1} |A_r(n,:)|^2,$$

which is the sum of the power spectrum of the A measurements across the antennas, corresponding to the element wise absolute value squared of the elements of the $n^{th}$ row vector of matrix A are first calculated 1110. In the same manner, the value $$\sum_{r=0}^{R-1} |B_r(n,:)|^2$$

corresponding to the element wise absolute value squared of the elements of the $n^{th}$ row vector of matrix B summed across the antennas are next calculated 1112. The power spectrum of the A measurement next may be interpolated to align with the sample points of the B measurement 1120. Both power spectra are processed by a CFAR type detector, for example, an ordered statistics CFAR (OS-CFAR) 1130 and 1132. Then each of the output detection vectors may be unfolded 1140 and 1142. The unfolded output detection vectors may then be processed by the logical AND operation 1150. This results in the fact that the positions where the vector output of the AND operation equal one represent the true velocity of a detected reflector 1160. Next, the AOA of the various velocity matches will be calculated 1170 (as will be described in greater detail below). Finally, it is determined if the detections having the same true velocity have the same AOA (as will be described in greater detail below).

When the outcome of the logical AND operation 1150 equals one, an additional check is performed to see if responses from Matrix A and Matrix B originate from the same angle of arrival. A check is based upon the samples of the A matrix at the indices (n, at which the outcome of the logical and operation equaled one.

$$\Psi_A(n,m)=[A_0(n,\tilde{m})A_1(n,\tilde{m}) \ldots A_{R-1}(n,\tilde{m})]\text{conjugate}(A_0(n,\tilde{m}))$$

In the same manner a vector including the samples of the B matrix is formed:

$$\Psi_B(n,m)=[B_0(n,\tilde{m})B_1(n,\tilde{m}) \ldots B_{R-1}(n,\tilde{m})]\text{conjugate}(B_0(n,\tilde{m}))$$

The multiplication with the conjugate of the first (or any other) sample of the vector removes the phase bias.

Note that $\tilde{m}$ is the index in the A and B matrix that most closely corresponds to the un-aliased index at which the outcome of the logical AND operation equaled one, these samples could be obtained by interpolation. An AOA check may be based upon the absolute value squared of the inner product of the virtual array steering vectors $\Psi_A$ and $\Psi_B$:

$$\alpha=|\Psi_A \Psi_B^H|^2$$

where H represent the complex conjugate transpose operation. If $\alpha$ exceeds a threshold, based on the power of $\Psi_A$ and $\Psi_B$, a detected target is declared. Consequently if the responses in FIG. 9 overlap, but the response originates from a different AOA then the frequency is declared invalid because the absolute value of the inner product is small. Therefore the probability of an incorrect combination of detections may be reduced.

By using multiple receiving antennas with separate RF receivers and analog to digital converters, the AOA check may be performed in the digital domain in parallel significantly increasing the update rate. Various known methods may be used to calculate the AOA of the reflected signal. AOA matches may be determined by comparing calculated AOA values.

Figure 12:
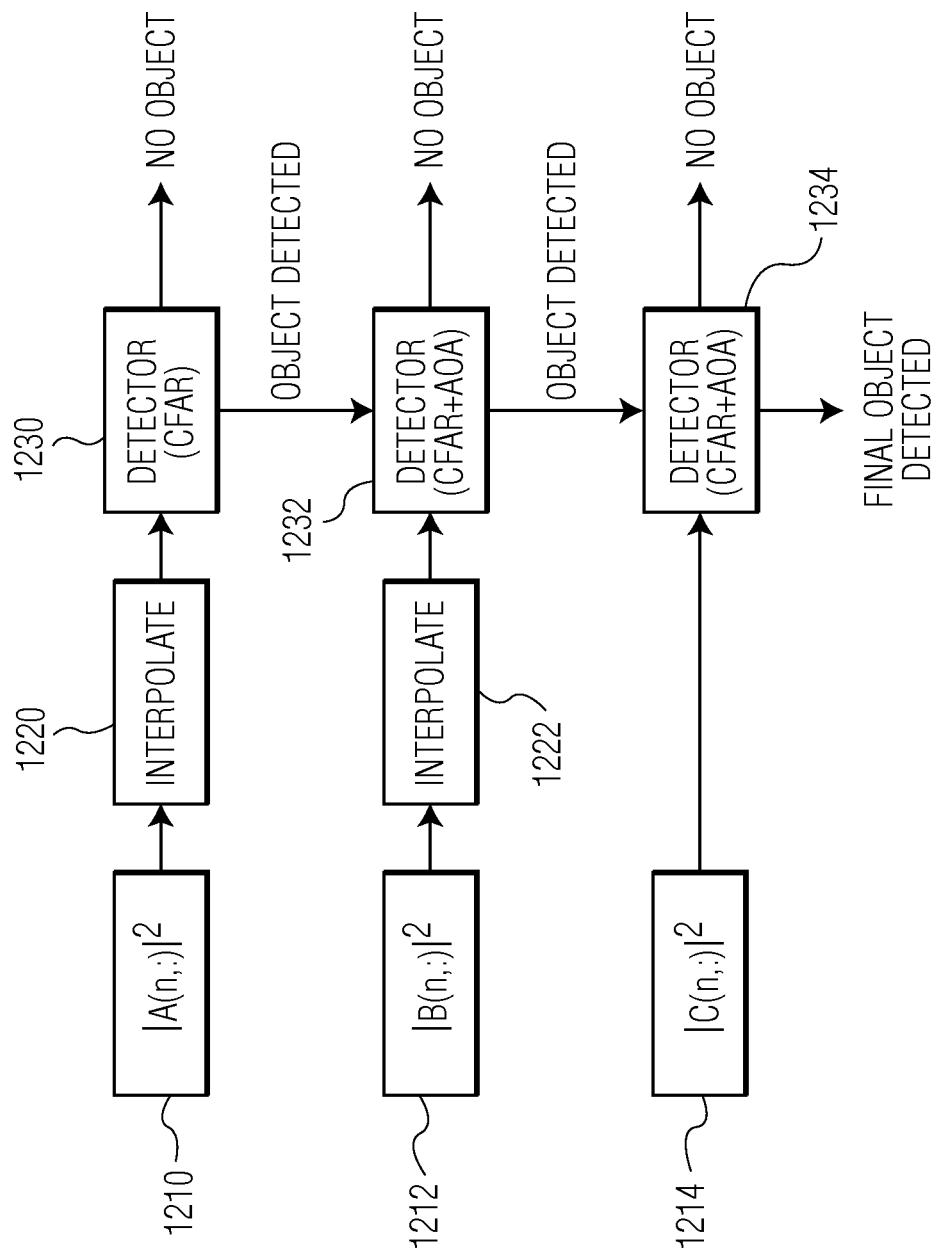
FIG. 12 illustrates an embodiment of radar signal processing using multistage cascaded detection.

An alternative embodiment may use multistage cascaded detection. FIG. 12 illustrates an embodiment of radar signal processing using multistage cascaded detection. Computation costs can be reduced using this cascaded detection scheme. For generality a third measurement C with $N_C$ chirps and Doppler sampling frequency even lower than the measurement B is assumed. The various functions of the multistage cascaded detection have elements that function like those shown in FIG. 11. The power spectrum of measurement A may first be calculated 1210, the frequency points interpolated 1220. The detection is performed first on measurement A 1230. If an object is found, then the detection is performed, but only for the corresponding parts of the measurement B. If an object is found in measurement B, the angle of arrival check may also be performed as described above. In this way the computation cost is reduced since for the measurement B as the detection is performed only at a small number of points corresponding to potential targets. If there is a next measurement C the computation is further reduced for that measurement. Hence, a reduction in processing may be accomplished. It is noted that any two of the three sets of measurements may be interpolated to match the frequency spacing of the third set of measurements.

Further, the interpolation is needed for comparing the different measurements. The computation costs for interpolation may be reduced by performing it only for the parts of measurements B and C that are potential objects to further reduce the computation costs.

If resolution is kept the same as before and if the measurement C has lower sampling frequency than B in the Doppler domain, the result will be that $N_A>N_B>N_C$. As a consequence the signal to noise ratio of measurement A will be highest and C lowest. Therefore the probability of detection error will be the lowest for the measurement A. As a result the multistage cascaded detector as shown in FIG. 12 which performs first detection on measurement A and then B and C is an efficient scheme that will minimize the chance of error due to cascaded scheme.

In the cascaded detection scheme it is also possible to reduce the memory requirements of the detection algorithm. For example, after the detection on measurement A, the detected objects positions and the corresponding sample values may be saved and the other parts of the measurement A discarded.

The embodiments described above use an FMCW radar as an example. The techniques for resolving ambiguities due to under sampling by means of multiple measurements that result in spectra with equal resolution and equal sampling frequency points after which simple checks reveal the true velocity may also be used for other types of radar, for example, pulsed radars. In the case of a pulsed radar, time of arrive of the signal is used to form range gates and then an FFT may be performed to resolve Doppler. This would result in the same range/relative velocity matrix that results from the 2D FFT on the received FMCW waveform. Then the same techniques may be applied to the pulsed radar range/relative velocity matrix to resolve the velocity ambiguities.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor, for example DSP above, to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A radar system comprising:
  a waveform generator configured to produce a first transmit signal including a first sequence of waveforms and a second transmit signal including a second sequence of waveforms, wherein the first and second transmit signals have different waveform repetition rates and the length of the sequences of the first and second signals is nearly equal;
  a transmitter configured to transmit the first and second transmit signals;
  a first receiver comprising:
    a first downconverter configured to downconvert the first received signal to produce a first downconverted signal and downconvert the second received signal to produce a second downconverted signal, wherein the first received signal corresponds to the first transmitted signal and the second received signal corresponds to the second transmitted signal; and
    a first analog to digital converter configured to convert the first downconverted signal to a first digital signal and the second downconverted signal to a second digital signal;
  a digital signal processor configured to:
    process the first digital signal to produce a first range/relative velocity matrix;
    detect objects in the first range/relative velocity matrix to produce a first detection vector;
    unfold the first detection vector;
    process the second digital signal to produce a second range/relative velocity matrix;
    interpolate the second range/relative velocity matrix in the relative velocity direction wherein the interpolated second range/relative velocity matrix has a frequency spacing corresponding to the frequency spacing of the first range/relative velocity matrix in the relative velocity direction;
    detect objects in the second range/relative velocity matrix to produce a second detection vector;
    unfold the second detection vector; and
    determine a true velocity of the detected objects based upon the unfolded first and second detection vectors.

2. The radar system of claim 1, wherein:
  the first transmit signal is a frequency modulated continuous wave (FMCW) signal including a first sequence of frequency chirped waveforms and the second transmit signal is a FMCW signal including a second sequence of frequency chirped waveforms;
  downconverting the first transmit signal includes mixing the first transmit signal with a first received signal and mixing the second transmit signal with a second received signal
  producing the first range/relative velocity matrix includes performing a two dimensional fast Fourier transform (FFT) on the first digital signal wherein the FFT in a first direction corresponds to range and the FFT in a second direction corresponds to relative velocity; and
  producing the second range/relative velocity matrix includes performing a two dimensional fast Fourier transform (FFT) on the second digital signal wherein the FFT in a first direction corresponds to range and the FFT in a second direction corresponds to relative velocity.

3. The radar system of claim 1, wherein:
  the first transmit signal is a pulsed radar signal including a first sequence waveforms having a first pulse repetition frequency (PRF) and the second transmit signal is a pulsed radar signal including a second sequence of waveforms having a second PRF;
  producing the first range/relative velocity matrix includes performing range gating on the first digital signal and a fast Fourier transform (FFT) on the first digital signal; and
  producing the second range/relative velocity matrix includes performing range gating on the second digital signal and a FFT on the second digital signal.

4. The radar system of claim 1, further comprising:
  a first antenna associated with the first receiver;
  a second receiver comprising:
    a second mixer configured to downconvert the third received signal to produce a third downconverted signal and downconvert the fourth received signal to produce a fourth downconverted signal, wherein the third received signal corresponds to the first transmitted signal and the fourth received signal corresponds to the second transmitted signal; and a second analog to digital converter configured to convert the third downconverted signal to a third digital signal and the fourth downconverted signal to a fourth digital signal;

a second antenna associated with the second receiver;

wherein the digital signal processor is further configured to:

combine the third digital signal with the first digital signal and combine the fourth digital signal with the second digital signal before processing the first and second digital signals to produce first and second range/relative velocity matrices;

determine a angle of arrival (AOA) match for the detected objects based upon the unfolded first and second detection vectors.

5. The radar system of claim 4, wherein the digital signal processor is further configured to calculate the AOA of detected objects.

6. The radar system of claim 1, wherein detecting an object includes using a constant false alarm rate detector.

7. The radar system of claim 1, wherein determining a true velocity of the detected objects includes performing a logical AND operation on the first and second unfolded detection vectors.

8. A method for determining the velocity of an object using radar system having a processor, comprising:

receiving, by a processor, a first digital signal corresponding to a first transmit signal;

receiving, by the processor, a second digital signal corresponding to a second transmit signal;

processing the first digital signal to produce a first range/relative velocity matrix;

detecting objects in the first range/relative velocity matrix to produce a first detection vector;

unfolding the first detection vector;

processing the second digital signal to produce a second range/relative velocity matrix;

interpolating the second range/relative velocity matrix in the relative velocity direction wherein the interpolated second range/relative velocity matrix has a frequency spacing corresponding to the frequency spacing of the first range/relative range velocity matrix in the relative velocity direction;

detecting objects in the second range/relative velocity matrix to produce a second detection vector;

unfolding the second detection vector; and determining a true velocity of the detected objects based upon the unfolded first and second detection vectors.

9. The method of claim 8, further comprising:

downconverting the first received signal to produce a first downconverted signal;

downconverting the second received signal to produce a second downconverted signal; and converting the first downconverted signal to a first digital signal and the second downconverted signal to a second digital signal, wherein the first received signal corresponds to the first transmitted signal and the second received signal corresponds to the second transmitted signal.

10. The method of claim 9, wherein:

the first transmit signal is a frequency modulated continuous wave (FMCW) signal including a first sequence of frequency chirped waveforms and the second transmit signal is a FMCW signal including a second sequence of frequency chirped waveforms;

downconverting the first transmit signal includes mixing the first transmit signal with a first received signal and mixing the second transmit signal with a second received signal producing the first range/relative velocity matrix includes performing a two dimensional fast Fourier transform (FFT) on the first digital signal wherein the FFT in a first direction corresponds to range and the FFT in a second direction corresponds to relative velocity; and producing the second range/relative velocity matrix includes performing a two dimensional fast Fourier transform (FFT) on the second digital signal wherein the FFT in a first direction corresponds to range and the FFT in a second direction corresponds to relative velocity.

11. The method of claim 9, wherein:

the first transmit signal is a pulsed radar signal including a first sequence waveforms having a first pulse repetition frequency (PRF) and the second transmit signal is a pulsed radar signal including a second sequence of waveforms having a second PRF;

producing the first range/relative velocity matrix includes performing range gating on the first digital signal and a fast Fourier transform (FFT) on the first digital signal; and producing the second range/relative velocity matrix includes performing range gating on the second digital signal and a FFT on the second digital signal.

12. The method of claim 9, further comprising:

downconverting the first received signal to produce a third downconverted signal;

downconverting the second received signal to produce a fourth downconverted signal;

wherein the third received signal corresponds to the first transmitted signal and the fourth received signal corresponds to the second transmitted signal; and converting the third downconverted signal to a third digital signal and the fourth downconverted signal to a fourth digital signal;

combining the third digital signal with the first digital signal and combining the fourth digital signal with the second digital signal before processing the first and second digital signals;

determining a angle of arrival (AOA) match for the detected objects based upon the unfolded first and second detection vectors, wherein a first antenna receives the first and second received signals, and wherein a second antenna receives the third and fourth received signals.

13. The method of claim 12, further comprising calculating the AOA of detected objects.

14. The method of claim 9, wherein detecting an object includes using a constant false alarm rate detector.

15. The method of claim 9, wherein determining a true velocity of the detected objects includes performing a logical AND operation on the first and second unfolded detection vectors.

16. A radar system comprising:

a transmitter configured to transmit a first transmit signal and a second transmit signal;

a receiver producing a first digital signal and a second digital signal;

a digital signal processor configured to:

receive, by a processor, the first digital signal corresponding to the first transmit signal;

processing the first digital signal to produce a first range/relative velocity matrix;
detect objects in the first range/relative velocity matrix to produce a first detection vector;
unfold the first detection vector;
when objects are detected in the first signal data:
receive the second digital signal corresponding to the second transmit signal;
process the second digital signal to produce a first range/relative velocity matrix;
interpolate the second range/relative velocity matrix in the relative velocity direction wherein the interpolated second range/relative velocity matrix has a frequency spacing corresponding to the frequency spacing of the first range/relative range velocity matrix in the relative velocity direction;
detect objects in the second range/relative velocity matrix to produce a second detection vector;
unfold the second detection vector; and
determine a true velocity of the detected objects based upon the unfolded first and second detection vectors.

17. The radar system of claim 16, wherein the first and second digital signal data each include received data from two different receive antennas and further comprising determining a angle of arrival (AOA) match for the detected objects based upon the unfolded first and second detection vectors.

18. The radar system of claim 16, further the receiver is further configured to:
downconvert the first received signal to produce a first downconverted signal;
downconvert the second received signal to produce a second downconverted signal; and
convert the first downconverted signal to the first digital signal and the second downconverted signal to the second digital signal,
wherein the first received signal corresponds to the first transmitted signal and the second received signal corresponds to the second transmitted signal.

19. The radar system of claim 18, wherein:
the first transmit signal is a frequency modulated continuous wave (FMCW) signal including a first sequence of frequency chirped waveforms and the second transmit signal is a FMCW signal including a second sequence of frequency chirped waveforms;
downconverting the first transmit signal includes mixing the first transmit signal with a first received signal and mixing the second transmit signal with a second received signal
producing the first range/relative velocity matrix includes performing a two dimensional fast Fourier transform (FFT) on the first digital signal wherein the FFT in a first direction corresponds to range and the FFT in a second direction corresponds to relative velocity; and
producing the second range/relative velocity matrix includes performing a two dimensional fast Fourier transform (FFT) on the second digital signal wherein the FFT in a first direction corresponds to range and the FFT in a second direction corresponds to relative velocity.

20. The radar system of claim 18, wherein:
the first transmit signal is a pulsed radar signal including a first sequence waveforms having a first pulse repetition frequency (PRF) and the second transmit signal is a pulsed radar signal including a second sequence of waveforms having a second PRF;
producing the first range/relative velocity matrix includes performing range gating on the first digital signal and a fast Fourier transform (FFT) on the first digital signal; and
producing the second range/relative velocity matrix includes performing range gating on the second digital signal and a FFT on the second digital signal.

* * * * *